United States Patent
Kim et al.

(10) Patent No.: US 11,870,033 B2
(45) Date of Patent: Jan. 9, 2024

(54) SOLID ELECTROLYTE, METHOD FOR PREPARING SAME, AND ALL-SOLID BATTERY COMPRISING SAME

(71) Applicant: LG CHEM, LTD., Seoul (KR)

(72) Inventors: Daeil Kim, Daejeon (KR); Jonghyun Chae, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 355 days.

(21) Appl. No.: 16/958,426

(22) PCT Filed: Jan. 11, 2019

(86) PCT No.: PCT/KR2019/000438
§ 371 (c)(1),
(2) Date: Jun. 26, 2020

(87) PCT Pub. No.: WO2020/013410
PCT Pub. Date: Jan. 16, 2020

(65) Prior Publication Data
US 2021/0066751 A1    Mar. 4, 2021

(30) Foreign Application Priority Data
Jul. 9, 2018   (KR) .................. 10-2018-0079193

(51) Int. Cl.
*H01M 10/0565* (2010.01)
*C08F 290/14* (2006.01)
(Continued)

(52) U.S. Cl.
CPC ..... *H01M 10/0565* (2013.01); *C08F 290/141* (2013.01); *H01M 10/0525* (2013.01);
(Continued)

(58) Field of Classification Search
CPC ..... H01M 2300/0082; H01M 10/0565; H01M 2300/0065; H01M 50/411; H01M 50/417;
(Continued)

(56) References Cited

U.S. PATENT DOCUMENTS 4,670,363 A * 6/1987 Whitney .......... H01M 10/0567
429/327
9,815,914 B2  11/2017 Wang et al.
(Continued)

FOREIGN PATENT DOCUMENTS

CN    103329332 A    9/2013
CN    103392255 A    11/2013
(Continued)

OTHER PUBLICATIONS

Extended European Search Report for European Application No. 19833879.0, dated Feb. 25, 2021.
(Continued)

*Primary Examiner* — Jeremiah R Smith
(74) *Attorney, Agent, or Firm* — Birch, Stewart, Kolasch & Birch, LLP

(57) ABSTRACT

A solid polymer electrolyte and a method of manufacturing the same are provided. More particularly, a solid polymer electrolyte having a high content of solids and exhibiting a flame retardant property and a method of manufacturing the same, wherein the solid polymer electrolyte includes a multifunctional acrylate-based polymer, a C2 to C10 polyalkylene oxide, a lithium salt and a non-aqueous solvent and wherein the multifunctional acrylate-based polymer is crosslinked with the polyalkylene oxide to form a semi-interpenetrating polymer network (semi-IPN).

16 Claims, 6 Drawing Sheets

(51) Int. Cl.
*H01M 10/0525* (2010.01)
*H01M 50/411* (2021.01)
*H01M 50/417* (2021.01)
*C08F 12/14* (2006.01)
*C08F 20/14* (2006.01)

(52) U.S. Cl.
CPC ....... *H01M 50/411* (2021.01); *H01M 50/417* (2021.01); *C08F 12/14* (2013.01); *C08F 20/14* (2013.01); *H01M 2300/0065* (2013.01); *H01M 2300/0082* (2013.01)

(58) Field of Classification Search
CPC . H01M 10/0525; C08F 290/141; C08F 12/14; C08F 20/14
See application file for complete search history.

(56) References Cited

U.S. PATENT DOCUMENTS

| | | | |
|---|---|---|---|
| 2002/0045101 A1* | 4/2002 | Hwang | H01M 10/052 429/231.95 |
| 2009/0325076 A1* | 12/2009 | Matsui | H01M 10/0569 429/326 |
| 2013/0295466 A1 | 11/2013 | Kwon et al. | |
| 2014/0004406 A1 | 1/2014 | Chang et al. | |
| 2015/0155594 A1* | 6/2015 | Lee | H01M 10/052 521/38 |
| 2016/0028111 A1 | 1/2016 | Ahn et al. | |
| 2016/0049690 A1* | 2/2016 | Basak | C25B 13/08 252/62.2 |
| 2016/0064773 A1* | 3/2016 | Choi | H01M 10/0565 429/313 |
| 2016/0104918 A1 | 4/2016 | Wang | |
| 2016/0351973 A1* | 12/2016 | Albano | H01M 4/628 |
| 2017/0125868 A1* | 5/2017 | Kim | H01M 10/0565 |
| 2017/0144904 A1 | 5/2017 | Shu et al. | |
| 2017/0338471 A1* | 11/2017 | Zheng | H01M 4/5825 |
| 2018/0034058 A1* | 2/2018 | Suh | H01M 4/587 |
| 2019/0198913 A1 | 6/2019 | Koh et al. | |

FOREIGN PATENT DOCUMENTS

| | | | | |
|---|---|---|---|---|
| CN | 104919632 | * | 9/2015 | ............. H01M 4/62 |
| CN | 104919638 | A | 9/2015 | |
| JP | 11-176472 | A | 7/1999 | |
| JP | 2006-24440 | A | 1/2006 | |
| JP | 2009-301833 | A | 12/2009 | |
| JP | 2014-504788 | A | 2/2014 | |
| JP | 2016-503572 | A | 2/2016 | |
| KR | 2006-134739 | A | 5/2006 | |
| KR | 10-2014-0145450 | A | 12/2014 | |
| KR | 20140145450 | * | 12/2014 | ............ H01M 10/52 |
| KR | 10-1527560 | B1 | 6/2015 | |
| KR | 10-2017-0005056 | A | 1/2017 | |
| KR | 10-2017-0050278 | A | 5/2017 | |
| KR | 10-2017-0050561 | A | 5/2017 | |
| KR | 10-2018-0000195 | A | 1/2018 | |
| KR | 10-2018-0076709 | A | 7/2018 | |
| WO | WO 2018/093032 | A1 | 5/2018 | |

OTHER PUBLICATIONS

International Search Report (PCT/ISA/210) issued in PCT/KR2019/000438, dated Apr. 22, 2019.

Ye et al., "Water Soluble Polymers as Proton Exchange Membranes for Fuel Cells," Polymers, vol. 4, 2012, pp. 913-963.

Zeng et al., "Reshaping Lithium Plating/Stripping Behavior via Bifunctional Polymer Electrolyte for Room-Temperature Solid Li Metal Batteries," Journal of the American Chemical Society, 138(49), pp. 15825-15828, [Published: Nov. 30, 2016, JRS].

* cited by examiner

| Component | Before Combustion | After Combustion | Grade |
|---|---|---|---|
| ETPTA (Film, solid) | | | X |
| PEO (Film, solid, 1,000K) | | | O |
| LiTFSI (solid, powder) | | | O |
| DMSO2 (solid, powder) | | | X |
| Sulfolane (Liquid) | | | X |
| TEGDME (Tetraethylene glycol dimethyl ether, Liquid) | | | X |
| Tetrabromo bisphenol A (Solid, powder) | | | O |
| ETPTA (Oligomer, liquid) | | | O |

FIG. 5

| Component | Before Combustion | After Combustion | Grade |
|---|---|---|---|
| DMSO (gel, solvent contents 64.3wt%) | | | X |
| D2SL29 (gel, solvent contents 52.5wt%) | | | X |
| D2SL55 (gel, solvent contents 26.4wt%) | | | X |
| D2SL55 with FR (gel, 0.97M LiTFSI, solvent contents 23.1wt%) | | | O |
| D2TDS5 with FR (gel, 2.12M LiTFSI, solvent contents 10.0wt%) | | | O |
| D2SL73 with FR (gel, 2.21M LiTFSI, solvent contents 9.5wt%) | | | O |

FIG. 6

SOLID ELECTROLYTE, METHOD FOR PREPARING SAME, AND ALL-SOLID BATTERY COMPRISING SAME

TECHNICAL FIELD

This application claims to the benefit of Korean Patent Application No. 10-2018-0079193 on Jul. 9, 2018 with the Korean Intellectual Property Office, the disclosure of which is herein incorporated by reference in its entirety.

The present invention relates to a solid electrolyte, a method of manufacturing the same, and an all-solid-state battery including the solid electrolyte.

BACKGROUND ART

Lithium ion secondary batteries having a high energy density, which have been currently used in laptop computers, smartphones, and the like, are composed of a positive electrode consisting of lithium oxides, a carbon-based negative electrode, a separator and an electrolyte. An electrolyte in a liquid state, particularly an ionically conductive organic liquid electrolyte in which salts are dissolved in a non-aqueous organic solvent, has been mainly used as the electrolyte in the prior art. However, when the electrolyte in a liquid state is used in this way, there is a strong possibility that an electrode material may be degraded and an organic solvent is likely to be highly volatile. In addition to this, there is a problem that its safety may be compromised by the combustion caused by an increase in an ambient temperature and a temperature of a battery itself. In particular, a lithium secondary battery has problems in that gases occur inside the battery due to the decomposition of an organic solvent and/or side reactions between the organic solvent and electrodes during the charge/discharge of the battery, thereby causing thickness swelling of the battery, and that these reactions are accelerated when the battery is stored at a high temperature, which results in increased generation of gases.

The gases continuously generated in this way may cause a decrease in safety by causing an increase in internal pressure of a prismatic battery so that the battery swells in a certain direction to explode, or deforming a central part of a certain plane of the battery. Also, the gases have a problem in that they induce a local difference in adhesion to electrode planes in the battery so that an electrode reaction cannot uniformly occur throughout the electrode planes, which results in degraded performance of the battery.

Therefore, studies on polymer electrolytes for lithium secondary batteries have been actively conducted so far to solve the problems such liquid electrolytes and replace the liquid electrolytes.

The polymer electrolytes are mainly divided into gel-type and solid-state polymer electrolytes. The gel-type polymer electrolyte is an electrolyte that exhibits conductivity by impregnating a liquid electrolyte having a high boiling point into a polymer film and fixing the liquid electrolyte together with a lithium salt. The solid-state polymer electrolyte is in such a form that a lithium salt is added to a polymer containing heteroelements, such as O, N, S, so that dissociated lithium cations can migrate into the polymer.

Because the gel-type polymer electrolyte contains a large amount of liquid electrolytes, it has ionic conductivity similar to pure liquid electrolytes. However, the gel-type polymer electrolyte has drawbacks in that it has stability-related problems and processing difficulties in manufacturing a battery.

Meanwhile, the solid-state polymer electrolyte has advantages in that it has improved stability-related problems with leakage and also exhibits high chemical and electrochemical stability because it does not include the liquid electrolytes. However, because the solid-state polymer electrolyte has very low ionic conductivity at room temperature, a lot of research has been conducted to solve the above problems.

Polyethylene oxide (PEO) is a material that has been most commonly used so far in the solid polymer electrolytes, and has an ability to conduct ions even when it is in a solid state. However, because linear PEO-based polymer electrolytes have a very low conductivity of $10^{-5}$ S/cm at room temperature due to high crystallinity, the linear PEO-based polymer electrolytes are difficult to apply to lithium secondary batteries. Also, the linear PEO-based polymer electrolytes do not have a good ability to process an electrolyte and a sufficient mechanical strength, and exhibit low voltage stability at less than 5 V. Therefore, the linear PEO-based polymer electrolytes may be difficult to apply to batteries so as to realize satisfactory battery performance.

To solve these problems, there are attempts to develop various materials such as mixed polymer electrolytes, interpenetrating network polymer electrolytes, nonwoven solid polymer electrolytes, and the like in order to apply these materials to batteries. However, these polymer electrolytes still have a problem in that they have low ionic conductivity and mechanical strength and a narrow drive voltage range.

Therefore, the solid polymer electrolytes essentially need to have high ionic conductivity, proper mechanical strength and wide drive voltage range and show a flame retardant property so as to ensure the driving stability of the batteries, and also need to include a minimum amount of a solvent to apply the polymer electrolytes to all-solid-state batteries.

PRIOR-ART DOCUMENT

Patent Document

Patent Document 1: Japanese Patent Application Publication No. 2006-134736 (May 25, 2006), Gel Electrolyte for Polymer Batteries and Polymer Batteries Comprising Same

DISCLOSURE

Technical Problem

As a result of extensive studies in view of the above, the inventors of the present invention have identified that when a C2 to C10 polyalkylene oxide is cross-linked with a multifunctional acrylate-based polymer to form semi-interpenetrating polymer networks (semi-IPNs), and a lithium salt and a non-aqueous solvent are added to the semi-IPNs to prepare a solid polymer electrolyte, the electrolyte has improved ionic conductivity and shows a flame retardant effect and a high solid content, thereby making it possible to effectively apply it to all-solid-state batteries. Therefore, the present invention has been completed based on these facts.

Accordingly, an object of the present invention is to provide a flame-retardant solid polymer electrolyte applicable to all-solid-state batteries, and also to provide an all-solid-state battery having improved performance, which includes the solid polymer electrolyte.

Technical Solution

According to an object of the present invention, there is provided a solid polymer electrolyte for secondary batteries, which includes a multifunctional acrylate-based polymer, a C2 to C10 polyalkylene oxide, a lithium salt and a non-aqueous solvent, wherein the multifunctional acrylate-based polymer is cross-linked with the polyalkylene oxide to form a semi-interpenetrating polymer network (semi-IPN).

According to one exemplary embodiment of the present invention, the C2 to C10 polyalkylene oxide may be present in an amount of from 0.1 parts by weight to 10 parts by weight, based on 100 parts by weight of the multifunctional acrylate-based polymer.

According to one exemplary embodiment of the present invention, the C2 to C10 polyalkylene oxide may have a weight average molecular weight of from 1,000 g/mol to 1,000,000 g/mol.

According to one exemplary embodiment of the present invention, the multifunctional acrylate-based polymer may include at least one monomer-derived polymerization unit selected from the group consisting of trimethylolpropane ethoxylate triacrylate, trimethylolpropane propoxylate triacrylate, polyethylene glycol dimethacrylate, polyethylene glycol diacrylate, polyester dimethacrylate, trimethylolpropane trimethacrylate, ethoxylated bisphenol A dimethacrylate, tetraethylene glycol diacrylate, 1,4-butanediol diacrylate, 1,6-hexandiol diacrylate, ditrimethylolpropane tetraacrylate, pentaerythritol tetraacrylate, pentaerythritol ethoxylate tetraacrylate, dipentaerythritol pentaacrylate, and dipentaerythritol hexaacrylate.

According to one exemplary embodiment of the present invention, the C2 to C10 polyalkylene oxide may include at least one selected from the group consisting of polyethylene oxide and polypropylene oxide.

According to one exemplary embodiment of the present invention, the lithium salt may include at least one selected from the group consisting of $LiPF_6$, $LiBF_4$, $LiSbF_6$, $LiAsF_6$, $LiOH$, $LiOH \cdot H_2O$, $LiBOB$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, LiTFSI, LiFSI, and $LiClO_4$.

According to one exemplary embodiment of the present invention, the lithium salt may be included in amount of from 10 parts by weight to 50 parts by weight, based on 100 parts by weight of the electrolyte.

According to one exemplary embodiment of the present invention, the lithium salt may have a concentration of from 0.5 M to 2.5 M relative to the non-aqueous solvent.

According to one exemplary embodiment of the present invention, the non-aqueous solvent may include at least one selected from the group consisting of dimethyl sulfone, sulfolane, and triethylene glycol dimethyl ether (TEGDME).

According to one exemplary embodiment of the present invention, the electrolyte may have a thickness of from 10 μm to 300 μm.

According to one exemplary embodiment of the present invention, the electrolyte may have an ionic conductivity at 25° C. of from $1.0 \times 10^{-6}$ S/cm to $5.0 \times 10^{-4}$ S/cm.

According to one exemplary embodiment of the present invention, the electrolyte may further include at least one flame-retardant additives selected from the group consisting of a halogen-based flame retardant, a phosphorus-based flame retardant, a nitrogen-based flame retardant and an inorganic compound flame retardant.

According to one exemplary embodiment of the present invention, the electrolyte may include more than 70% by weight of solids including the multifunctional acrylate-based polymer, the C2 to C10 polyalkylene oxide, the lithium salt and the non-aqueous solvent, based on a total weight of the electrolyte.

According to one exemplary embodiment of the present invention, the electrolyte may include more than 90% by weight of solids comprising the multifunctional acrylate-based polymer, the C2 to C10 polyalkylene oxide, the lithium salt and the non-aqueous solvent, based on a total weight of the electrolyte.

According to another object of the present invention, there is provided a method of manufacturing the aforementioned solid polymer electrolyte for secondary batteries, which includes:

(1) mixing an electrolyte composition including a multifunctional acrylate-based polymer monomer, a C2 to C10 polyalkylene oxide, a lithium salt and a non-aqueous solvent;

(2) melting the electrolyte composition at 100° to 150° C. and (3) photopolymerizing the melted electrolyte composition to obtain the electrolyte.

According to one exemplary embodiment of the present invention, the method may include further adding at least one photoinitiators selected from the group consisting of 2,2-dimethoxy-2-phenylacetonephenone (DMPA), 2-hydroxy-2-methylpropipphenone (HOMPP), lithium phenyl-2,4,6-trimethylbenzoylphosphinate (LAP), and IRGACURE 2959 (1-[4-(2-Hydroxyethoxy)-phenyl]-2-hydroxy-2-methyl-1-propane-1-one) at step (1).

According to the other object of the present invention, there is provided an all-solid-state battery including the aforementioned solid polymer electrolyte and electrodes.

Advantageous Effects

The solid polymer electrolyte according to the present invention has improved ionic conductivity and exhibits a flame retardant effect. Also, the solid polymer electrolyte of the present invention can be effectively applied to all-solid-state batteries due to the high solid content, and show high mechanical stability and voltage stability.

DESCRIPTION OF DRAWINGS

FIG. 5 is an image of comparing flame retardant properties of components of the electrolytes according to Examples and Comparative Examples of the present invention.

FIG. 6 is an image of comparing flame retardant properties of the electrolytes according to Examples and Comparative Examples of the present invention.

BEST MODE

Figure 1:
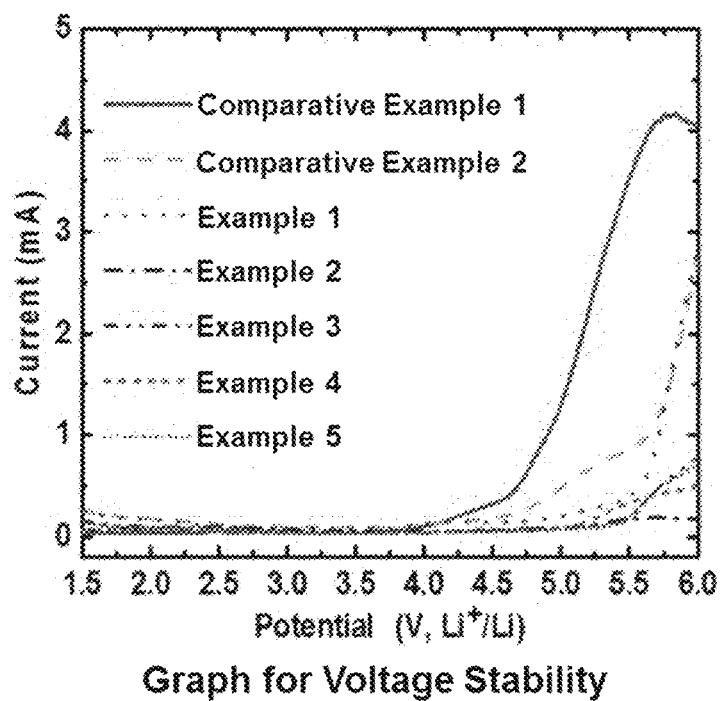
FIG. 1 is a graph for voltage stability of electrolytes according to Examples and Comparative Examples of the present invention.

Hereinafter, the present invention will be described in further detail with reference to the accompanying drawings so that a person having ordinary skill in the art to which the present invention belongs can easily put the invention into practice. However, it should be understood that the present invention may be embodied in various forms, but is not intended to be limiting in this context.

The terms and words used in the present specification and the claims are not intended to be construed as having common and dictionary meanings but are construed as having meanings and concepts corresponding to the technical spirit of the present invention in view of the principle that the present inventors can properly define the concepts of the terms and words in order to describe his/her invention with the best method.

The terms used in the present invention are merely used to explain certain examples, and is not intended to limit the present invention. The singular forms "a," "an" and "the" are intended to include the plural forms as well, unless the context clearly indicates otherwise. It will be further understood that the terms "comprising," "including" and/or "having," when used herein, specify the presence of stated features, integers, steps, operations, elements, components and/or groups thereof, but do not preclude the presence or addition of one or more other features, integers, steps, operations, elements, components and/or groups thereof.

Solid Polymer Electrolyte

The present invention provides a solid polymer electrolyte having a high solid content and showing a flame retardant effect and a method of manufacturing the same. In this case, the solid polymer electrolyte includes a multifunctional acrylate-based polymer, a C2 to C10 polyalkylene oxide, a lithium salt and a non-aqueous solvent, wherein the multifunctional acrylate-based polymer is cross-linked with the polyalkylene oxide to form semi-interpenetrating polymer networks (semi-IPNs).

A polymer electrolyte to which a conventional polyethylene oxide is applied has limitations in that it has low ionic conductivity due to its high crystallinity in a polymer structure. However, the polymer electrolyte according to one exemplary embodiment of the present invention has low crystallinity when a polymer in which a multifunctional acrylate-based polymer is cross-linked with a C2 to C10 polyalkylene oxide is applied to the polymer electrolyte. In this case, because more lithium ions are dissociated due to improved fluidity of polymer chains and an increased dielectric constant of the polymer, the polymer electrolyte of the present invention may exhibit higher ionic conductivity, compared to the conventional polyethylene oxide-based polymers. Also, because the polymer in which the multifunctional acrylate-based polymer is cross-linked with the C2 to C10 polyalkylene oxide form semi-interpenetrating polymer networks, a polymer electrolyte including the semi-interpenetrating polymer networks may have improved stability and mechanical strength, and show excellent ionic conductivity as well. The semi-interpenetrating polymer networks (semi-IPNs) means that a linear polymer and a cross-linked polymer form a network structure. For example, such semi-interpenetrating polymer networks may have robust and tough properties and superior flexibility, compared to the conventional copolymers because two types of polymers are tied in the form of chains and a network structure is formed in the polymer networks.

The polyalkylene oxide may include specifically a C2 to C20 alkylene, or a C2 to C10 alkylene. For example, the polyalkylene oxide may comprise one selected from the group consisting of polyethylene oxide, polypropylene oxide, polybutylene oxide or a combination thereof. Preferably, the polyalkylene oxide may be polyethylene oxide.

The multifunctional acrylate-based polymer may be a compound having two or more double bonds at the end. Non-limiting examples of the multifunctional acrylate-based polymer may comprise one monomer-derived polymerization unit selected from the group consisting of trimethylolpropane ethoxylate triacrylate, trimethylolpropane propoxylate triacrylate, polyethylene glycol dimethacrylate, polyethylene glycol diacrylate, polyester dimethacrylate, trimethylolpropane trimethacrylate, ethoxylated bisphenol A dimethacrylate, tetraethylene glycol diacrylate, 1,4-butanediol diacrylate, 1,6-hexandiol diacrylate, ditrimethylolpropane tetraacrylate, pentaerythritol tetraacrylate, pentaerythritol ethoxylate tetraacrylate, dipentaerythritol pentaacrylate, dipentaerythritol hexaacrylate and a combination thereof. The monomer-derived polymerization unit refers to a moiety constituting a polymer, that is, a moiety derived from a certain monomer in a molecular structure of the polymer. For example, an acrylonitrile-derived polymerization unit refers to a moiety derived from acrylonitrile in a molecular structure of the polymer.

The polyalkylene oxide may have a weight average molecular weight of from 1,000 to 1,500,000 g/mol. In particular, the weight average molecular weight of the polyalkylene oxide may be in a range of from 1,000 to 600,000 g/mol, preferably from 1,000 to 100,000 g/mol. In this case, excellent ionic conductivity may be exhibited in the above-mentioned range. Within the above-mentioned range, the smaller weight average molecular weight, the better fluidity of polymer chains and the higher ionic conductivity.

In one exemplary embodiment of the present invention, the polyalkylene oxide may be included in an amount of from 0.1 to 10 parts by weight, based on 100 parts by weight of the multifunctional acrylate-based polymer. Particularly, the polyalkylene oxide may be included in an amount of from 1 to 10 parts by weight, preferably from 2 to 10 parts by weight. As the content of the polyalkylene oxide increases in the above-mentioned range, the ion transfer capacity of the semi-interpenetrating polymer networks may be improved.

Meanwhile, the solid polymer electrolyte may include a lithium salt. The lithium salt may serve as a source of lithium ions in a battery to allow a basic operation of a lithium secondary battery, and act to promote migration of lithium ions between a positive electrode and a negative electrode. The lithium salt may include one selected from the group consisting of $LiPF_6$, $LiBF_4$, $LiSbF_6$, $LiAsF_6$, $LiOH$, $LiOH \cdot H_2O$, $LiBOB$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, LiTFSI, LiFSI, $LiClO_4$ and a combination thereof, but the present invention is not limited thereto.

The lithium salt may be included in an amount of from 10 to 50 parts by weight, particularly from 20 to 47 parts by weight, based on 100 parts by weight of the electrolyte. When the lithium salt is included in an amount of less than 10 parts by weight, ionic conductivity of the electrolyte may be lowered due to a low content of the lithium salt. On the other hand, when the lithium salt is included in an amount of more than 50 parts by weight, the lithium salt in the polymer electrolyte may be present in a crystalline state without being dissociated completely. In this case, the lithium salts does not contribute to the ionic conductivity, and may rather serve to hinder the ionic conductivity, thereby causing a decrease in ionic conductivity. Also, because the mechanical strength of the solid polymer electrolyte may be reduced due to a relative decrease in content of the polymer, the content of the lithium salt is properly adjusted within the above-mentioned range.

The lithium salt may be present in a concentration of from 0.5 to 2.5 M, particularly from 0.97 to 2.22 M relative to the non-aqueous solvent according to one exemplary embodiment of the present invention as will be described below. The lithium salt may be added in a proper amount in aspects of the relative relationship with the content of the non-aqueous solvent capable of ionizing lithium, and the normal supply of lithium ions needed to drive a battery. When the concentration of the lithium salt is less than 0.5 M, ionic conductivity of the electrolyte may be lowered. On the other hand, when the concentration of the lithium salt is greater than 2.5 M, the lithium salt may be crystallized to serve with resistance inside the battery. Further improved battery characteristics may be obtained within the above-mentioned concentration range.

The polymer electrolyte according to one exemplary embodiment may exhibit excellent ionic conductivity. Specifically, the polymer electrolyte may have an ionic conductivity at 25° C. of from $1.0 \times 10^{-6}$ to $5.0 \times 10^{-4}$ S/cm.

In the case of the conventional all-solid-state batteries, a non-aqueous solvent such as dimethyl sulfoxide (DMSO) and the like has been commonly used, but the solvent such as dimethyl sulfoxide and the like has a problem in that it is difficult to endow a flame retardant property to ensure stability of the battery.

Therefore, according to one exemplary embodiment of the present invention, the non-aqueous solvent may include one selected from the group consisting of dimethyl sulfone, sulfolane, triethylene glycol dimethyl ether (TEGDME) and a combination thereof. As one non-limiting example, the dimethyl sulfone (DMSO$_2$, methylsulfonylmethane) or sulfolane is a solvent that is in a solid state at room temperature. Therefore, a solid polymer electrolyte including the solvent has advantages in that a solid content of the electrolyte is increased so that the electrolyte can be easily applied to all-solid-state batteries and endowed with a flame retardant property, thereby ensuring the stability of the batteries. The following Table 1 lists the characteristics of the dimethyl sulfone (DMSO$_2$, methylsulfonylmethane) and sulfolane that are types of the non-aqueous solvent according to the present invention.

TABLE 1

| Flame retardant | Dielectric constant | $T_m$ (° C.) | $T_b$ (° C.) | Flash point (° C.) | NFPA 704-Flammabillity |
|---|---|---|---|---|---|
| D2 (Methylsulfonylmethane) | 47 | 109 | 248 | 143 | 1 |

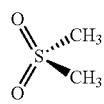

TABLE 1-continued

| Flame retardant | Dielectric constant | $T_m$ (° C.) | $T_b$ (° C.) | Flash point (° C.) | NFPA 704-Flammabillity |
|---|---|---|---|---|---|
| SL (Sulfolane) | 44 | 28 | 287 | 177 | I |

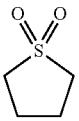

As described above, the National Fire Protection Association (NFPA) evaluates flame resistance grades and biological safety of flame retardants to rate the flame retardants. As an index, flame resistance grade 1 belongs to materials having a flash point of 93.3° C. or higher, and flame resistance grade 0 belongs to stone, concrete, sand, etc. Referring to Table 1, because the dimethyl sulfone (DMSO$_2$, methylsulfonylmethane) and sulfolane are in a solid state at room temperature (based on 25° C.), electrolytes including the solvent have an advantage in that they have an increased solid content, and a flame retardant property of the electrolytes may be endowed because the electrolytes have a flash point of 140° C. or higher.

The non-aqueous solvent may be included in an amount of from 1 to 30 parts by weight, particularly from 5 to 30 parts by weight, based on 100 parts by weight of the electrolyte. When the non-aqueous solvent is included in an amount of less than 1 part by weight, it is difficult to homogenously mix an electrolyte composition, which makes it difficult to perform a manufacturing process smoothly. On the other hand, when the non-aqueous solvent is included in an amount of more than 30 parts by weight, the mechanical strength of the solid polymer electrolyte may be degraded due to a relative decrease in content of a polymer. Therefore, the content of the non-aqueous solvent is properly adjusted within the above-mentioned range.

The electrolyte according to one exemplary embodiment of the present invention preferably has a thickness of from 10 to 300 μm. As the electrolyte gets thinner in thickness, energy density may be improved, and ionic conductivity may be enhanced. However, when the thickness is less than 10 μm, it is difficult to ensure proper mechanical strength of the electrolyte. Therefore, the thickness of the electrolyte is properly adjusted within the above-mentioned thickness range.

According to one exemplary embodiment of the present invention, the solid polymer electrolyte may further include a flame-retardant additive to give a flame retardant property. The flame-retardant additive serves to prevent an all-solid-state battery from being burned easily in order to prevent larger conflagrations even when the all-solid-state battery is fired due to a sudden increase in temperature of the battery.

The flame-retardant additive that may be used in the present invention is not particularly limited, and known flame retardants may be used herein.

For example, at least one selected from the group consisting of a halogen-based flame retardant, a phosphorus-based flame retardant, a nitrogen-based flame retardant and an inorganic compound flame retardant may be used as the flame retardant, but the present invention is not limited thereto.

More particularly, at least one selected from the group consisting of tribromo phenoxyethane, tetrabromobisphenol-A (TBBA), octabromo diphenylether (OBDPE), pentabromodiphenyl ethane (PBDE), 2,4,6-tris(2,4,6-tribromophenoxy)-1,3,5 triazine, a brominated epoxy resin, a brominated polycarbonate oligomer, chlorinated paraffin, chlorinated polyethylene and an alicyclic chlorine-based flame retardant may be used as the halogen-based flame retardant;

at least one selected from the group consisting of ammonium phosphate, phosphine oxides, phosphine oxide diols, phosphites, phosphonates, bisphenol-A diphosphate (BPADP), triaryl phosphates, alkyldiaryl phosphates, trialkyl phosphates and resorcinaol bisdiphenyl phosphate (RDP) may be used as the phosphorus-based flame retardant;

at least one selected from the group consisting of melamine, melamine phosphate and melamine cyanurate may be used as the nitrogen-based flame retardant and at least one selected from the group consisting of aluminum hydroxide, magnesium hydroxide, barium hydroxide, antimony oxide, tin hydroxide, tin oxide, molybdenum oxide, zirconium compounds, borates and calcium salts may be used as the inorganic compound flame retardant, but the present invention is not limited thereto.

The electrolyte according to one exemplary embodiment of the present invention may include more than 70% by weight of the solids including the multifunctional acrylate-based polymer, the C2 to C10 polyalkylene oxide, the lithium salt and the non-aqueous solvent, based on the total weight of the electrolyte.

The solvents (for example, dimethyl sulfoxide (DMSO)) commonly used to manufacture the conventional solid electrolytes have limitations in increasing a solid content of the electrolyte because the solvents are present in a liquid state at room temperature and the electrolyte composition has a solubility limit in the solvent. However, when the electrolyte includes the non-aqueous solvent according to the present invention, the solvent itself is present in a solid state at room temperature. Therefore, when an electrolyte is manufactured through a melting process, an increase in solid content may be caused, compared to when using the conventional solvents. Preferably, the solid content may be greater than or equal to 90% by weight.

Because an increase in the solid content in the electrolyte results in a decreased content of the solvent included in the solid electrolyte, the electrolyte has an advantage in that all-solid-state batteries including the electrolyte may exhibit stable driving characteristics at room temperature, and also has an advantage in that manufacturing costs may be reduced because a smaller amount of drying energy may be used to remove the solvent during a manufacturing process.

Method of Manufacturing Solid Polymer Electrolyte

According to one exemplary embodiment of the present invention, there is provided a method of manufacturing the solid polymer electrolyte. The method of manufacturing the electrolyte is not particularly limited. In this case, methods known in the related art may be used.

The method includes (1) mixing an electrolyte composition including a multifunctional acrylate-based polymer monomer, a C2 to C10 polyalkylene oxide, a lithium salt and a non-aqueous solvent; (2) melting the electrolyte composition at 100 to 150° C. and (3) photopolymerizing the melted electrolyte composition to obtain an electrolyte. The C2 to C10 polyalkylene oxide may be cross-linked with the multifunctional acrylate-based polymer by means of the method to manufacture a solid polymer electrolyte, which forms semi-interpenetrating polymer networks (semi-IPNs).

The multifunctional acrylate-based polymer monomer may be a compound having two or more double bonds at the end, and specific examples are as described above. In step (1), the polyalkylene oxide may be included in an amount of from 0.1 to 10 parts by weight, based on 100 parts by weight of the multifunctional acrylate-based polymer monomer. Particularly, the polyalkylene oxide may be included in an amount of from 1 to 10 parts by weight, from 2 to 10 parts by weight. As the amount of the polyalkylene oxide increase in the above-mentioned range, the ion transfer capacity of the semi-interpenetrating polymer networks may be improved.

In this case, the method may be carried out by further adding a photoinitiator. For example, the photoinitiator may include at least one photoinitiators selected from the group consisting of 2,2-dimethoxy-2-phenylacetonephenone (DMPA), 2-hydroxy-2-methylpropipphenone (HOMPP), lithium phenyl-2,4,6-trimethylbenzoylphosphinate (LAP), IRGACURE 2959 (1-[4-(2-Hydroxyethoxy)-phenyl]-2-hydroxy-2-methyl-1-propane–1-one) and the like. Preferably, HOMPP (2-hydroxy-2-methylpropipphenone) may be used, but the present invention is not particularly limited thereto. The photoinitiator may form radicals by means of ultraviolet irradiation. In this case, when a concentration of the photoinitiator is very low, a photopolymerization reaction may not occur efficiently, which results in incomplete formation of the polymer electrolyte. On the other hand, when the concentration of the photoinitiator is very high, a photopolymerization reaction may occur rapidly, which results in degraded uniformity and limited applicability of the polymer electrolyte. Therefore, a proper amount of the photoinitiator may be used depending on the desired physical properties of the electrolyte.

In the step of mixing the multifunctional acrylate-based polymer monomer and the C2 to C10 polyalkylene oxide, a lithium salt may be further added and mixed therewith. In this case, ionic conductivity of the solid polymer electrolyte may be improved, and performance of the battery may be enhanced. A description of the lithium salt is as described above. The lithium salt may be added in an amount of from 10 to 50 parts by weight, particularly from 20 to 47 parts by weight, based on 100 parts by weight of the multifunctional acrylate-based polymer monomer. In this case, the polymer electrolyte exhibiting excellent ionic conductivity may be manufactured.

In step (1), the non-aqueous solvent may also further added and mixed. The non-aqueous solvent according to one exemplary embodiment of the present invention may be in a solid state at room temperature, and thus may be homogeneously mixed with the electrolyte composition through a melting process in step (2). The non-aqueous solvent may be added in an amount of from 1 to 30 parts by weight, particularly from 1 to 10 parts by weight, based on 100 parts by weight of the multifunctional acrylate-based polymer monomer. In this case, the polymer electrolyte having a high solid content may be manufactured.

Step (2) may include homogeneously mixing the electrolyte composition, which is, melting the electrolyte composition at a temperature of 100 to 150° C. while stirring. When the melting is carried out at temperature of less than 100° C., the non-aqueous solvent included in the electrolyte composition may not be melted, which makes it impossible to homogeneously mix the composition. On the other hand, when the melting is carried out at temperature of greater than 150° C., the manufactured electrolyte has a problem in that the electrolyte does not exhibit physical properties suitable for batteries. Therefore, the melting temperature is properly adjusted within the above-mentioned temperature range. The electrolyte composition may be melted in the above-mentioned temperature range, and stirred for 12 to 24 hours to prepare a homogeneous mixture. The stirring is not particularly limited, and methods known in the related art may be used herein.

Step (3) of photopolymerizing the homogeneously mixed electrolyte composition to form semi-interpenetrating polymer networks may be carried by irradiating the electrolyte composition obtained in step (2) with ultraviolet rays (UV). In this case, the UV irradiation has an advantage in that a polymerization may occur within a very short time. The ultraviolet rays applied to the electrolyte composition may be ultraviolet rays having a wavelength of 254 to 360 nm. The ultraviolet rays are rays having a wavelength shorter than purple of visible light, and are abbreviated as UV. In this case, the ultraviolet rays are divided into ultraviolet A (320 nm to 400 nm) having long wavelengths, ultraviolet B (280 nm to 300 nm) having medium wavelengths, and ultraviolet C (100 nm to 280 nm) having short wavelengths. When the electrolyte composition is irradiated with ultraviolet rays, the irradiation time of the ultraviolet rays may be in a range of 5 to 30 minutes. However, because the irradiation time of the ultraviolet rays may vary depending on the intensity of ultraviolet rays (UV) to be irradiated, the irradiation time of the ultraviolet rays (UV) is not limited to the above-mentioned irradiation time range.

All-Solid-State Battery

According to another exemplary embodiment of the present invention, there is provided an all-solid-state battery including the solid polymer electrolyte and electrodes.

The all-solid-state battery provided in the present invention defines a configuration of the solid polymer electrolyte as provided above, and other elements constituting the all-solid-state battery, that is, a positive electrode and a negative electrode are not described in the present invention, and see the following description.

As the negative electrode of the all-solid-state battery, a lithium metal may be used alone, or a negative electrode active material stacked on a negative electrode current collector may be used.

In this case, the negative electrode active material that may be used herein may include one selected from the group consisting of a lithium metal, a lithium alloy, a lithium metal composite oxide, a lithium-containing titanium composite oxide (LTO) and a combination thereof. In this case, alloys of lithium with at least one metals selected from the group consisting of Na, K, Rb, Cs, Fr, Be, Mg, Ca, Sr, Ba, Ra, Al and Sn may be used as the lithium alloy. Also, the lithium metal composite oxide may be a metal composite oxide formed by lithium and an oxide ($MeO_x$) of one metal (Me) selected from the group consisting of Si, Sn, Zn, Mg, Cd, Ce, Ni, and Fe. As one example, the lithium metal composite oxide may be $Li_xFe_2O_3$ ($0<x\leq1$) or $Li_xWO_2$ ($0<x\leq1$).

In addition, metal composite oxides such as $Sn_xMe_{1-x}Me'_yO_z$ (Me: Mn, Fe, Pb, Ge; Me': Al, B, P, Si, elements of Groups I, II and III in the periodic table of elements, a halogen; $0<x\leq1$; $1\leq y\leq3$; $1\leq z\leq8$) and the like; oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$ and the like may be used as the negative electrode active material. Also, carbon-based negative electrode active materials such as crystalline carbon, amorphous carbon or a carbon composite may be used alone or in combination of two or more types Also, the negative electrode current collector is not particularly limited as long as it has conductivity without causing any chemical change in all-solid-state batteries. For example, copper, stainless steel, aluminum, nickel, titanium, baked carbon, copper or stainless steel of which surface is treated with carbon, nickel, titanium, silver and the like, aluminum-cadmium alloys and the like may be used herein. Like the positive electrode current collector, the negative electrode current collector may also be used in various forms such as films, sheets, foil, nets, porous body, foams, and non-woven fabrics, all of which have fine irregularities formed on a surface thereof.

The positive electrode of the all-solid-state battery according to the present invention is not particularly limited, and may be a material used for known all-solid-state batteries.

When the electrode is a positive electrode, it is a positive electrode current collector, and when the electrode is a negative electrode, it is a negative electrode current collector.

The positive electrode current collector is not particularly limited as long as it has high conductivity without causing any chemical change in the corresponding batteries. For example, stainless steel, aluminum, nickel, titanium, baked carbon, aluminum or stainless steel of which surface is treated with carbon, nickel, titanium, silver and the like may be used herein.

The positive electrode active material may differ depending on the use of the lithium secondary battery. In this case, lithium transition metal oxides such as $LiNi_{0.8-x}Co_{0.2}Al_xO_2$, $LiCo_xMn_yO_2$, $LiNi_xCo_yO_2$, $LiNi_xMn_yO_2$, $LiNi_xCo_yMn_zO_2$, $LiCoO_2$, $LiNiO_2$, $LiMnO_2$, $LiFePO_4$, $LiCoPO_4$, $LiMnPO_4$ and $Li_4Ti_5O_{12}$; chalcogenides such as $Cu_2Mo_6S_8$, FeS, CoS and MiS; oxides, sulfides or halides of scandium, ruthenium, titanium, vanadium, molybdenum, chromium, manganese, iron, cobalt, nickel, copper, zinc and the like may be used. More particularly, $TiS_2$, $ZrS_2$, $RuO_2$, $Co_3O_4$, $Mo_6S_8$, $V_2O_5$ and the like may be used, but the present invention is not limited thereto.

The shape of the positive electrode active material is not particularly limited, and may include a particulate shape, for example, a spherical, oval, or rectangular shape. An average particle diameter of the positive electrode active material may be in a range of from 1 to 50 μm, but the present invention is not limited thereto. The average particle diameter of the positive electrode active material may, for example, be obtained by measuring particle diameters of active materials observed under a scanning electron microscope and calculating an average value of the particle diameters.

A binder included in the positive electrode is not particularly limited, and fluorine-containing binders such as polyvinylidene fluoride (PVDF) and polytetrafluoroethylene (PTFE) may be used herein.

A content of the binder is not particularly limited as long as it can fix the positive electrode active material. For example, the content of the binder may be in a range of from 0 to 10% by weight, based on the total weight of the positive electrode.

A conductive material may be further included in the positive electrode. The conductive material is not particularly limited as long as it can improve conductivity of the positive electrode, and examples of the conductive material may include nickel powder, cobalt oxide, titanium oxide, carbon and the like. The carbon may include at least one selected from the group consisting of Ketjen Black, Acetylene Black, Furnace Black, graphite, carbon fibers, and fullerene.

In this case, a content of the conductive material may be selected in consideration of other factors of the battery such as the type of the conductive material and the like. For example, the content of the conductive material may be in a range of from 1 to 10% by weight, based on the total weight of the positive electrode.

The manufacture of the all-solid-state battery having a configuration as described above is not particularly limited in the present invention. In this case, the all-solid-state battery may be manufactured using methods known in the prior art.

For example, a cell may be assembled by disposing a solid electrolyte between a positive electrode and a negative electrode and subjecting the solid electrolyte to compression molding. Also, the cells may be manufactured so that a first polymer electrolyte layer of the polymer electrolyte can be disposed in contact with the positive electrode.

The assembled cell may be mounted in an exterior material, and encapsulated through heating compression. Laminate packs such as aluminum, stainless steel and the like, cylindrical or angular metallic containers may be very suitable as the exterior material.

MODE FOR INVENTION

Hereinafter, the present invention will be described in further detail with reference with Examples thereof. However, it should be understood that the scope and contents of the present invention are not construed to be reduced or limited to the examples, or the like. Also, it will be appreciated that the present invention in which the specific experimental results are not provided may be easily put into practice by persons having ordinary skill in art on the basis of the disclosure of the present invention including the following Examples. In this case, it will be apparent that such modifications and changes fall within the scope of the appended claims.

EXAMPLES: SYNTHESIS OF SOLID POLYMER ELECTROLYTE

Figure 4:
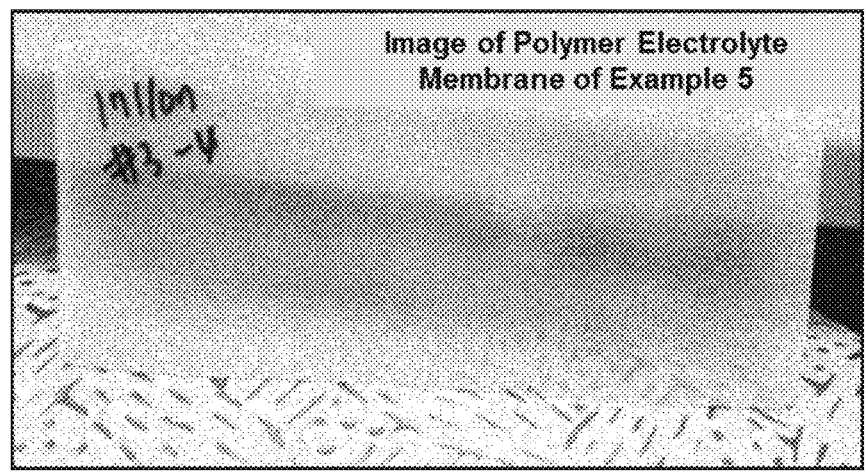
FIG. 4 is an image of a polymer electrolyte according to Example of the present invention.

Trimethylpropane ethoxylate triacrylate (ETPTA), polyethylene oxide (PEO, Mw=600,000 to 1,000,000 g/mol), LiTFSI, a combination of methylsulfonylmethane ($DMSO_2$), sulfolane and triethylene glycol dimethyl ether (TEGDME), 2-hydroxy-2-methylpropipphenone (HOMPP) and tetrabromobisphenol A (TBBA) were added as a monomer of a multifunctional acrylate-based polymer, a C2 to C10 polyalkylene oxide, a lithium salt, a non-aqueous solvent, a photoinitiator and a flame-retardant additive, respectively, under the conditions listed in Table 2 below, and the resulting mixture was melted at 120° C. while stirring for 24 hours to prepare an electrolyte composition. Thereafter, a Teflon release film was coated with the electrolyte composition using a doctor blade and irradiated with ultraviolet rays to perform a photopolymerization reaction. The UV irradiation was sequentially carried out for 1 minute at a wavelength of 325 nm, followed by irradiation for 1 minute at a wavelength of 254 nm and for 1 minute at a wavelength of 365 nm. After the UV irradiation was completed, a solid polymer electrolyte formed in the form of a film on the Teflon release film was obtained. FIG. 4 shows the electrolyte manufactured in Example 5 as described above.

TABLE 2

|  | ETPTA (g) | PEO (g) | LiTFSI (M) | Non-aqueous solvent (g) | HOMPP (g) | TBBA (g) |
| --- | --- | --- | --- | --- | --- | --- |
| Example 1 | 4.44 | 0.08 | 1.05 | D2 5.07:SL 5.07 mixed | 0.05 | — |
| Example 2 | 4.5 | 0.1 | 0.97 | D2 5.0:SL 5.0 mixed | 0.05 | 2.5 |
| Example 3 | 2.1 | 0.1 | 1.31 | D2 5.0:SL 5.0 mixed | 0.05 | 4.5 |
| Example 4 | 2.5 | 0.3 | 2.15 | D2 3.5:TEGDME 1.9 mixed | 0.03 | 2.0 |
| Example 5 | 2.5 | 0.3 | 2.2 | D2 3.5:SL 1.9 mixed | 0.03 | 2.0 |

\* In the non-aqueous solvents listed in the table, methylsulfonylmethane, sulforane and triethylene glycol dimethyl ether are abbrebiated as D2, SL and TEGDME, respectively.

Comparative Example 1: Synthesis of Solid Polymer Electrolyte 1 mL of trimethylpropane ethoxylate triacrylate (ETPTA) as a multifunctional acrylate-based polymer, 0.01 mL of 2-hydroxy-2-methylpropipphenone (HOMPP) as a photoinitiator, 1 M LiTFSI (based on 4 mL of dimethyl sulfoxide (DMSO)) as a lithium salt and 2.5% by weight of polyethylene oxide (based on dimethyl sulfoxide (DMSO)) based on the electrolyte were added and the resulting mixture was melted at 60° C. while stirring for 24 hours to prepare an electrolyte composition. A Teflon release film was coated with the electrolyte composition and irradiated with ultraviolet rays to perform a photopolymerization reaction. The UV irradiation was sequentially carried out for 1 minute at a wavelength of 325 nm, followed by irradiation for 1 minute at a wavelength of 254 nm and for 1 minute at a wavelength of 365 nm. After the UV irradiation was completed, a solid polymer electrolyte formed in the form of a film on the Teflon release film was obtained.

Comparative Example 2: Synthesis of Solid Polymer Electrolyte

An electrolyte was manufactured in the same manner as in Examples, except that an electrolyte composition was prepared using the components and contents listed in Table 3 below.

TABLE 3

| | ETPTA (g) | PEO (g) | LiTFSI (M) | Non-aqueous solvent (g) | HOMPP (g) | TBBA (g) |
|---|---|---|---|---|---|---|
| Comparative Example 2 | 4.44 | 0.07 | 0.48 | D2 2.31:SL 9.84 mixed | 0.05 | — |

Experimental Example 1: Evaluation of Voltage Stability

The voltage stability of the solid polymer electrolytes manufactured in Examples 1 to 5 and Comparative Examples 1 and 2 was evaluated using linear sweep voltammetry (LSV) and VMP3 commercially available from BioLogic was used. One surface of each of the electrolytes of Examples and Comparative Examples was in contact with a lithium metal electrode and the other surface was in contact with a SUS substrate to manufacture a coin cell. In this case, the cells were measured in a voltage range of 1.5 V to 6.0 V at a scan rage 10 mV/s.

As shown in FIG. 1, it was confirmed that the electrolytes of Examples exhibited stable characteristics at a high voltage of 5.0 V or more, compared to the electrolytes of Comparative Examples.

Experimental Example 2: Evaluation of Ionic Conductivity

After the impedance of the electrolytes manufactured in Example 1 to 5 and Comparative Examples 1 and 2 was measured, the ionic conductivity of the electrolytes was calculated using Equation 1 below.

Figure 2:
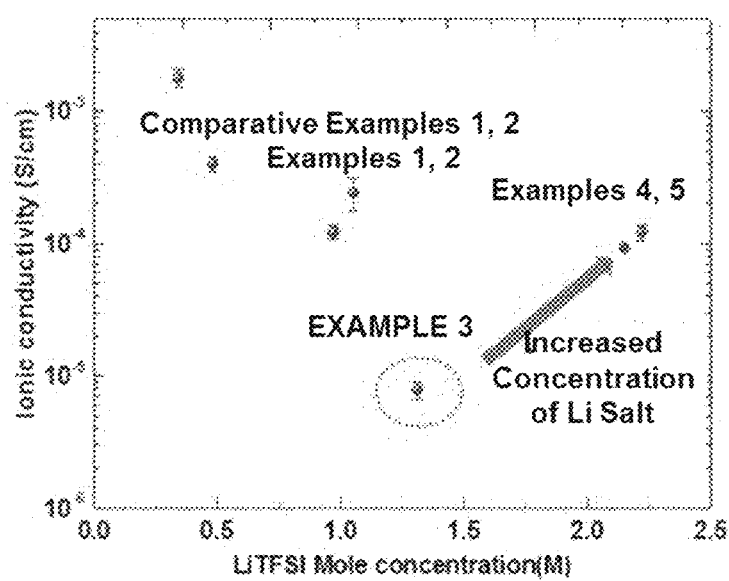
FIG. 2 is a graph of comparing ionic conductivity of the electrolytes according to Examples and Comparative Examples of the present invention.
Figure 3:
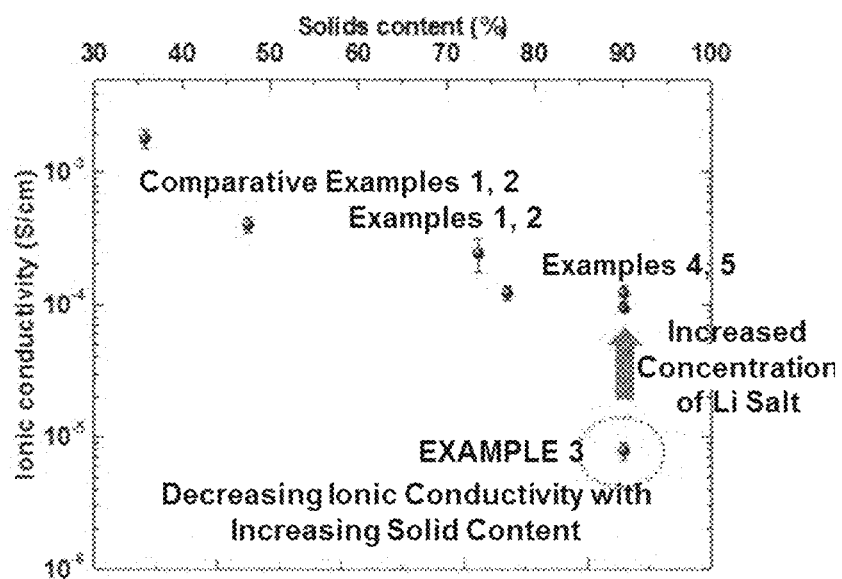
FIG. 3 is a graph of comparing ionic conductivity of the electrolytes according to Examples and Comparative Examples of the present invention depending on the solid contents.

A film sample of the polymer solid electrolyte having a predetermined wide and thickness was prepared for measurements. As an ion blocking electrode, a SUS substrate having excellent electronic conductivity was in contact with both surfaces of a planar sample, and an alternating current voltage was applied through electrodes on both surfaces of the sample. In this case, a measurement frequency was set to an amplitude range of 1.0 MHz to 0.1 Hz and the impedance was measured under applied conditions using VMP3 commercially available from BioLogic. The resistance of the bulky electrolyte was calculated from a point of intersection ($R_b$) at which a semicircle or straight line of the measured impedance locus comes in contact with the real-number axis, and the ionic conductivity of a polymer solid electrolyte membrane was calculated from the area and thickness of the sample. The resistance and ionic conductivity are shown in FIGS. 2 and 3, respectively, depending on the concentration of the lithium salt and the content of solids.

$$\sigma(S \cdot cm^{-1}) = \frac{1}{R_b} \frac{t}{A} \quad \text{[Equation 1]}$$

σ: Ionic conductivity
$R_b$: Point of intersection between impedance locus and real-number axis
A: Area of sample
t: Thickness of sample Referring to FIG. 2, it can be seen that the ionic conductivity of the electrolytes was enhanced in the case of Examples 4 and 5 in which a concentration of the lithium salt was increased compared to the electrolyte of Example 3. Referring to FIG. 3, it was confirmed that the ionic conductivity of the electrolytes was lowered with an increasing content of solids in the electrolytes of Examples, but confirmed that the electrolytes of Examples 4 and 5 in which the concentration of the lithium salt was increased exhibited ionic conductivity suitable for stable driving of the all-solid-state battery.

Figure 7:
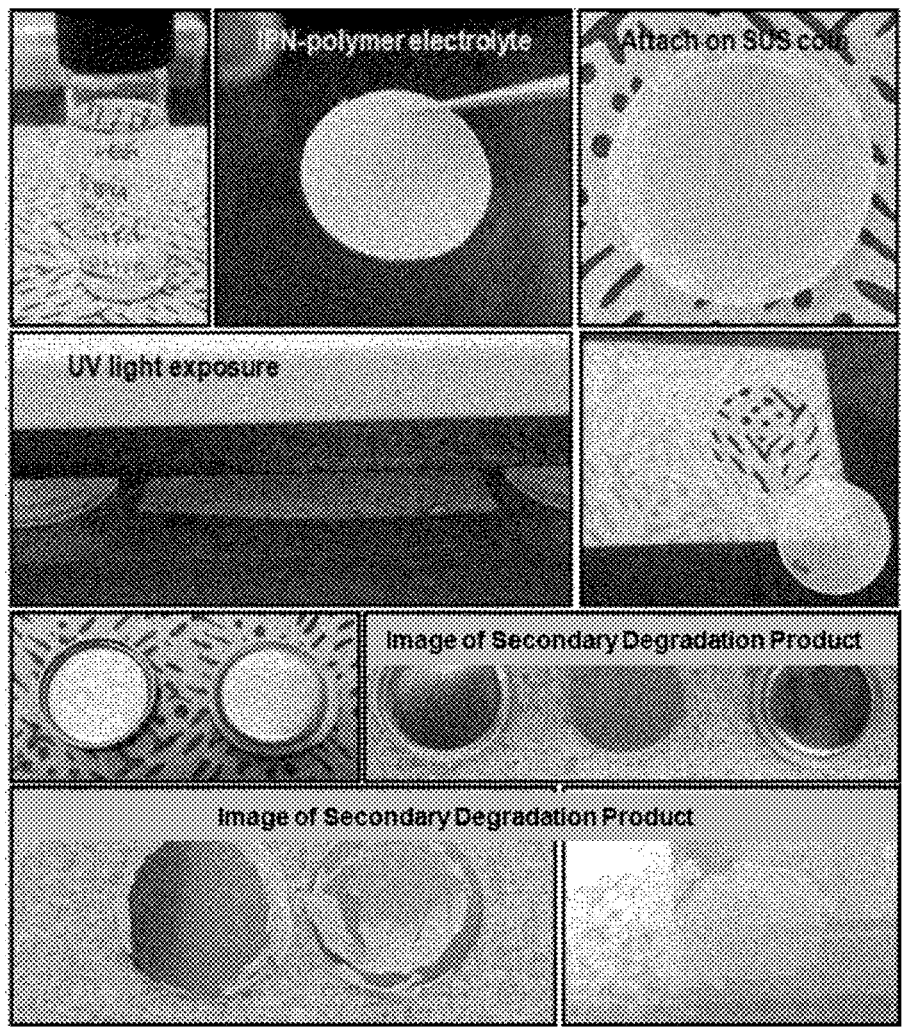
FIG. 7 is an image of relating to the stability measurement of the electrolytes according to Examples and Comparative Examples of the present invention.
Figure 8:
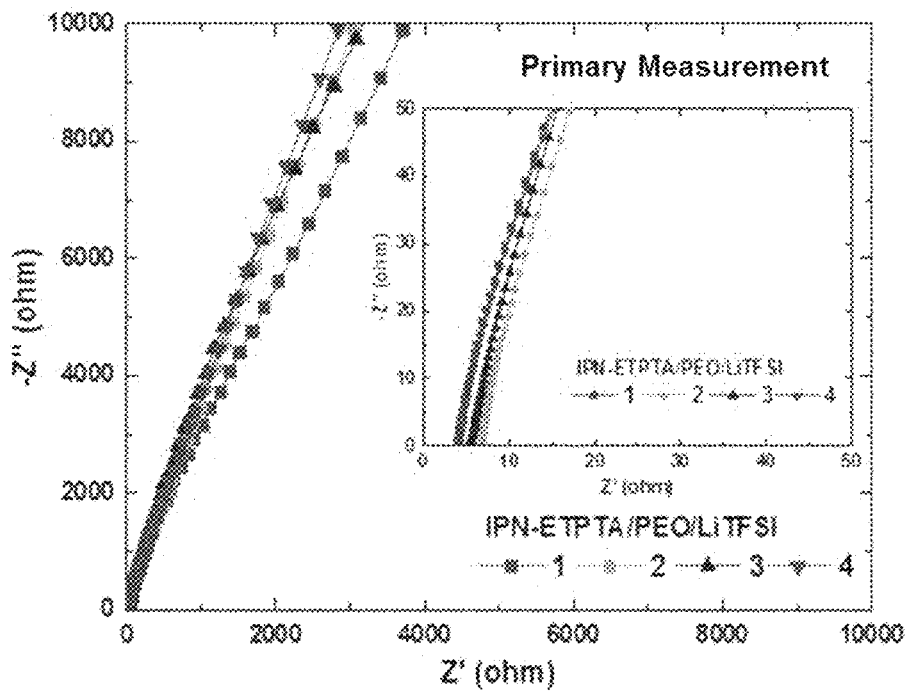
FIG. 8 shows the ionic conductivity of the electrolytes according to Comparative Examples of the present invention.
Figure 9:
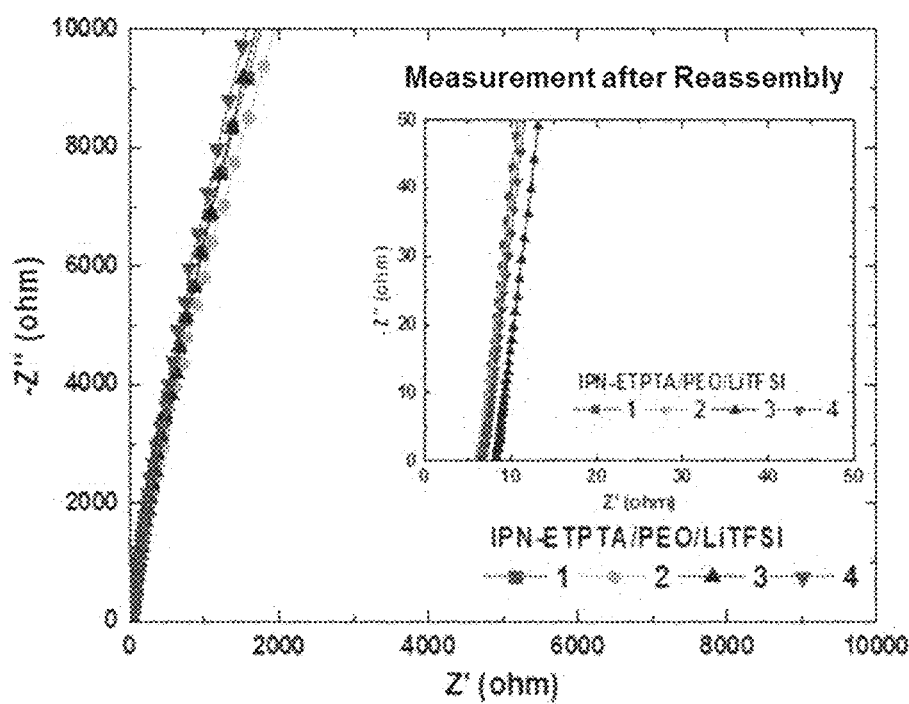
FIG. 9 shows the ionic conductivity of the electrolytes according to Comparative Examples of the present invention when the electrolytes are reassembled.

FIG. 7 shows the characteristics of the electrolyte manufactured in Comparative Example 1. Referring to FIG. 7, it was confirmed that the electrolyte of Comparative Example 1 was maintained in the form of a free-standing film, but the crack occurrence, the crushed electrolytes, and solvent leakage were observed after disassembly of the electrolyte. A resistance value was calculated from a Nyquist plot for measured impedance values of Experimental Example 2 and the ionic conductivity of Comparative Example 1 was calculated using the resistance value. As a result, it was confirmed that the ionic conductivity of Comparative Example 1 was 2.51±0.97×10$^{-3}$ S/cm (FIG. 8). Also, the same electrolyte was disassembled, and the leaked solvent was then removed. Then, the electrolyte was reassembled and measured. As a result, it was confirmed that the electrolyte exhibited a high ionic conductivity value of 1.83±0.75×10$^{-3}$ S/cm (FIG. 9). However, it was contemplated that the high ionic conductivity of the electrolyte of Comparative Example 1 was due to the high content (i.e., 74.3% by weight) of the solvent.

The experimental results of Comparative Examples and Examples are listed in Table 4 below.

TABLE 4

| | Polymer (% by weight) ETPTA/PEO | LiTFSI (% by weight) (M) | Solid content (% by weight) | Ionic conductivity (mS/cm, at 25° C.) | Voltage stability (V) |
|---|---|---|---|---|---|
| Comparative Example 1 | 26.9 | 8.9(0.34M) | 35.8 | 1.80 | 4.0 |
| Comparative Example 2 | 24.1 | 11.0(0.48M) | 47.5 | 0.40 | 4.5 |
| Example 1 | 23.5 | 23.7(1.05M) | 73.6 | 0.24 | >5.0 |
| Example 2 | 21.3 | 20.8(0.97M) | 76.9 | 0.12 | >5.0 |
| Example 3 | 47.7 | 29.6(1.31M) | 90.1 | 0.008 | >5.0 |
| Example 4 | 14.6 | 46.9(2.15M) | 90.1 | 0.09 | >5.0 |
| Example 5 | 14.6 | 46.9(2.22M) | 90.1 | 0.12 | >5.0 |

Referring to Table 4, it can be seen that the electrolytes manufactured in Examples of the present invention had a solid content of 70% by weight or more, preferably 90% by weight or more when the solids were included in the electrolyte by adjusting the content of the solvent and the content of the lithium salt, had an ionic conductivity of 0.1 mS/cm or more and a high-voltage stability at 5 V or more and exhibited the free-standing mechanical properties so that it was applicable to all-solid-state batteries. Also, it was desirable that a flame-retardant additive was added to ensure the safety of the all-solid-state battery including the electrolytes of Examples.

In the case of Comparative Examples 1 and 2, the contents of the solids were 35.8% by weight and 47.5% by weight, respectively, the values of which were lower than those of the electrolytes of Examples, and the concentration of the lithium salt was less than or equal to 0.5 M. Nevertheless, it was confirmed that the electrolytes of Comparative Examples 1 and 2 had an ionic conductivity of 0.4 mS/cm, but had low voltage stability at 5 V or less and did not show a flame retardant property.

In the case of Examples 1 and 2, it was confirmed that the ionic conductivity of the electrolytes was lowered as the contents of the solids increased compared to Comparative Examples 1 and 2, but the electrolytes had an improved flame retardant property when the electrolytes included the flame-retardant additive.

In the case of Example 3, it was confirmed that the ionic conductivity of the electrolyte was lowered as the content of the solids increased to 90% by weight, but the electrolyte had an improved flame retardant property when the electrolyte included the flame-retardant additive as described in Examples 1 and 2.

In the case of Examples 4 and 5, it was confirmed that the mechanical stability of the electrolytes was ensured and applicability of the all-solid-state battery was enhanced when the contents of the solids was set to 90% by weight or more, and also that a high concentration of the lithium salt was applied to solve the problems regarding a decrease in ionic conductivity caused due to an increase in content of the solids. Also, it was confirmed that the flame retardant properties of the electrolytes were enhanced by increasing a mixing ratio of methylsulfonylmethane ($DMSO_2$) as a solvent, which was present in a solid state at room temperature, so as to increase a solid content of the electrolyte, and varying a mixing ratio of the flame-retardant non-aqueous solvent.

Experimental Example 3: Experiment on Flame Retardant Property

To check a flame retardant property of the electrolyte according to the present invention, samples of the respective components and circular samples of the electrolytes manufactured in Comparative Examples and Examples, which had a diameter size of 2 cm, were prepared. Each of the samples was burned using a torch and then checked for flame retardant properties. FIG. 5 shows the results of comparing the flame retardant properties of the respective components included in the electrolyte according to the present invention and FIG. 6 shows the results of comparing the flame retardant properties of the electrolytes manufactured in the comparative examples and examples.

Referring to FIGS. 5 and 6, it can be seen that the non-aqueous solvent according to the present invention showed characteristics such as steam generation and combustion with fire even when there was a difference in time, and that the ETPTA oligomer, PEO, and LiTFSI showed flame retardant properties. Also, it can be seen that all the polymer electrolytes to which 10% by weight of the flame retardant was added showed an excellent flame retardant property because the polymer electrolytes exhibited self-extinguishing properties in which flames disappeared within 2 seconds in a state in which the polymer electrolytes were not combusted by fire (O: Excellent flame retardant property, x: No flame retardant property).

The invention claimed is:

1. A solid polymer electrolyte comprising:
 a multifunctional acrylate-based polymer;
 a C2 to C10 polyalkylene oxide;
 a lithium salt; and
 a non-aqueous solvent, which is present in a solid state at room temperature and is homogeneously mixed within the solid polymer electrolyte through a melting process, and wherein the non-aqueous solvent comprises dimethyl sulfone,
 wherein the multifunctional acrylate-based polymer and the polyalkylene oxide form a semi-interpenetrating polymer network (semi-IPN), and
 wherein the multifunctional acrylate-based polymer, the C2 to C10 polyalkylene oxide, the lithium salt and the non-aqueous solvent together are present in an amount of more than 70% by weight of solids, based on a total weight of the electrolyte.

2. The solid polymer electrolyte of claim 1, wherein the C2 to C10 polyalkylene oxide is present in an amount of from 0.1 parts by weight to 10 parts by weight, based on 100 parts by weight of the multifunctional acrylate-based polymer.

3. The solid polymer electrolyte of claim 2, wherein the C2 to C10 polyalkylene oxide has a weight average molecular weight of from 1,000 g/mol to 1,500,000 g/mol.

4. The solid polymer electrolyte of claim 1, wherein the multifunctional acrylate-based polymer comprises at least one polymerization unit derived from a monomer selected from trimethylolpropane ethoxylate triacrylate, trimethylolpropane propoxylate triacrylate, polyethylene glycol dimethacrylate, polyethylene glycol diacrylate, polyester dimethacrylate, trimethylolpropane trimethacrylate, ethoxylated bisphenol A dimethacrylate, tetraethylene glycol diacrylate, 1,4-butanediol diacrylate, 1,6-hexanediol diacrylate, ditrimethylolpropane tetraacrylate, pentaerythritol tetraacrylate, pentaerythritol ethoxylate tetraacrylate, dipentaerythritol pentaacrylate, and dipentaerythritol hexaacrylate.

5. The solid polymer electrolyte of claim 1, wherein the C2 to C10 polyalkylene oxide comprises at least one of polyethylene oxide and polypropylene oxide.

6. The solid polymer electrolyte of claim 1, wherein the lithium salt comprises at least one of $LiPF_6$, $LiBF_4$, $LiSbF_6$, $LiAsF_6$, LiOH, $LiOH \cdot H_2O$, LiBOB, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, LiTFSI, LiFSI, and $LiClO_4$.

7. The solid polymer electrolyte of claim 1, wherein the lithium salt is present in an amount of from 10 parts by weight to 50 parts by weight, based on 100 parts by weight of the electrolyte.

8. The solid polymer electrolyte of claim 1, wherein the lithium salt has a concentration of from 0.5 M to 2.5 M relative to the non-aqueous solvent.

9. The solid polymer electrolyte of claim 1, wherein the non-aqueous solvent further comprises at least one of sulfolane, and triethylene glycol dimethyl ether (TEGDME).

10. The solid polymer electrolyte of claim 1, wherein the electrolyte has a thickness of from 10 μm to 300 μm.

11. The solid polymer electrolyte of claim 1, wherein the electrolyte has an ionic conductivity at 25° C. of from $1.0 \times 10^{-6}$ S/cm to $5.0 \times 10^{-4}$ S/cm.

12. The solid polymer electrolyte of claim 1, wherein the electrolyte further comprises at least one flame-retardant additive selected from a halogen-based flame retardant, a phosphorus-based flame retardant, a nitrogen-based flame retardant and an inorganic compound flame retardant.

13. The solid polymer electrolyte of claim 1, wherein the electrolyte comprises more than 90% by weight of solids comprising the multifunctional acrylate-based polymer, the C2 to C10 polyalkylene oxide, the lithium salt and the non-aqueous solvent, based on a total weight of the electrolyte.

14. A method of manufacturing the electrolyte according to claim 1 comprising:
  (1) mixing an electrolyte composition comprising a multifunctional acrylate-based polymer monomer, a C2 to C10 polyalkylene oxide, a lithium salt and a non-aqueous solvent;
  (2) melting the electrolyte composition at 100° C. to 150° C. and
  (3) photopolymerizing the melted electrolyte composition to obtain the electrolyte.

15. The method of claim 14, wherein the method comprises further adding at least one photoinitiator selected from the group consisting of 2,2-dimethoxy-2-phenylacetonephenone (DMPA), 2-hydroxy-2-methylpropipphenone (HOMPP), lithium phenyl-2,4,6-trimethylbenzoylphosphinate (LAP), and IRGACURE 2959 (1-[4-(2-Hydroxyethoxy)-phenyl]-2-hydroxy-2-methyl-1-propane-1-one) at step (1).

16. An all-solid-state battery comprising the solid polymer electrolyte according to claim 1 and electrodes.

* * * * *